United States Patent [19]

Krasser et al.

[11] 4,069,289
[45] Jan. 17, 1978

[54] METHOD OF FORMING ELEMENTS OF INSULATING MATERIAL ON A BIMETAL STRIP

[75] Inventors: Fritz Krasser; William F. Sell, both of Altdorf, Germany

[73] Assignee: Ellenberger & Poensgen GmbH, Altdorf, Germany

[21] Appl. No.: 676,516

[22] Filed: Apr. 13, 1976

[30] Foreign Application Priority Data

May 20, 1975 Germany .............................. 2520884

[51] Int. Cl.² .............................................. B29C 6/04
[52] U.S. Cl. .................... 264/157; 264/251; 264/272; 264/274; 264/275
[58] Field of Search ............... 264/250, 251, 274, 275, 264/272, 157

[56] References Cited

U.S. PATENT DOCUMENTS

| | | | |
|---|---|---|---|
| 2,465,656 | 3/1949 | Morin | 264/251 |
| 2,884,661 | 5/1959 | Hurley | 264/251 |
| 3,328,846 | 7/1967 | Morin | 264/274 X |
| 3,539,675 | 11/1970 | Hugill | 264/251 X |
| 3,571,920 | 3/1971 | Berg | 264/272 X |
| 3,592,887 | 7/1971 | Edwards | 264/275 X |
| 3,763,300 | 10/1973 | Spanjer | 264/275 X |
| 4,008,302 | 2/1977 | Erlichman | 264/251 X |

FOREIGN PATENT DOCUMENTS

| | | | |
|---|---|---|---|
| 1,665,921 | 1971 | Germany | 264/272 |
| 773,837 | 1957 | United Kingdom | 264/251 |

*Primary Examiner*—Richard R. Kucia
*Attorney, Agent, or Firm*—Spencer & Kaye

[57] ABSTRACT

A method of moulding an element of an insulating material, such as a thermosetting plastics material, on a bimetal strip in which the bimetal strip is clamped in an injection mould by narrow clamping jaws disposed on either side of the mould cavity in the longitudinal direction of the bimetal strip. The width of the clamping jaws is such as to enable the remaining portions of bimetal strip to bow freely in response to heat present in the injection mould.

The bimetal strips may be processed individually or as a group formed from a blank, the individual bimetal strips in the group being transversely joined to each other.

5 Claims, 9 Drawing Figures

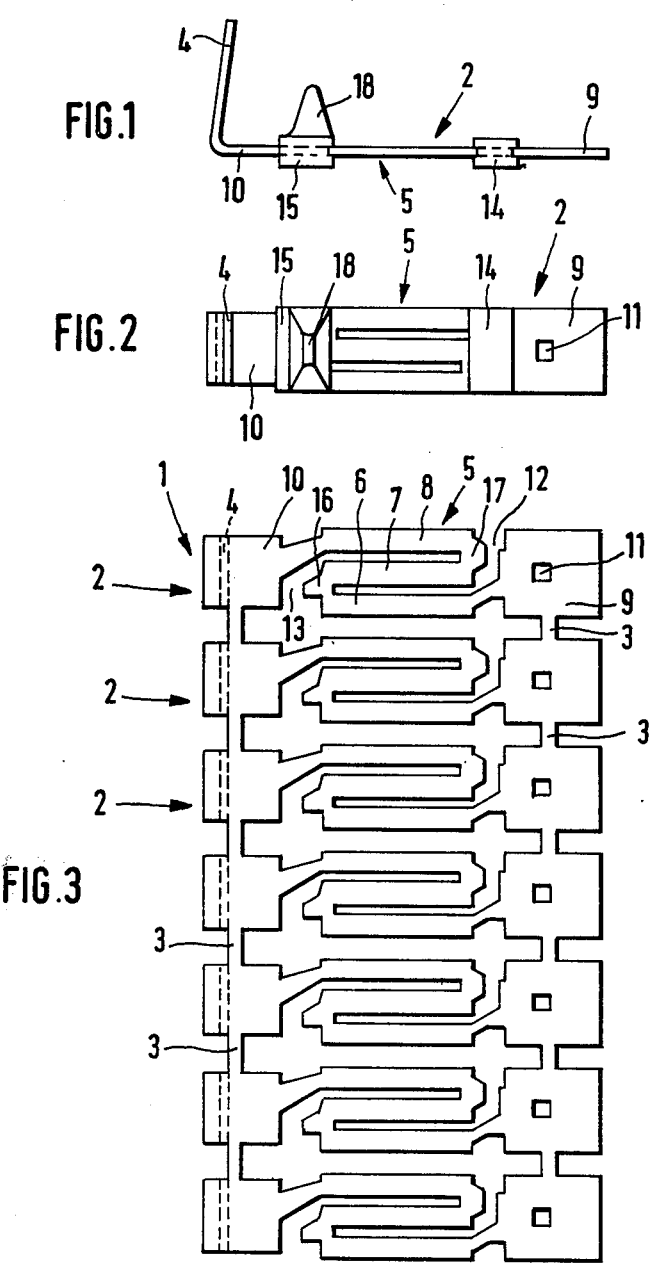

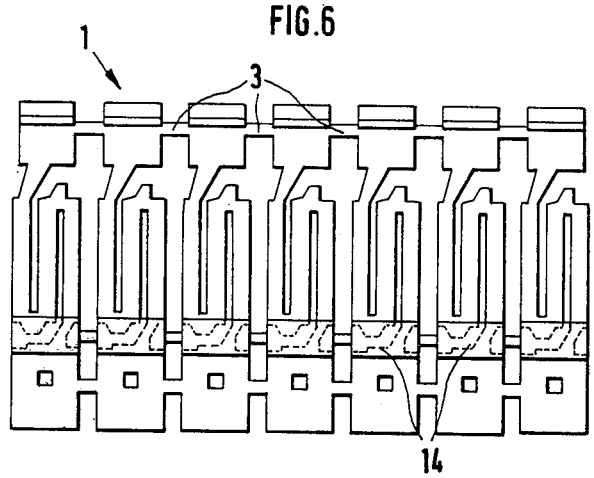
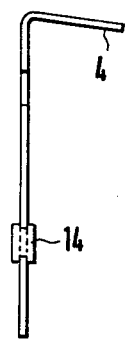
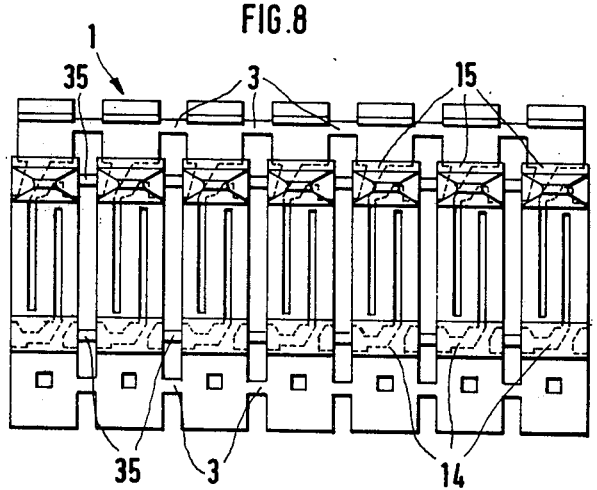
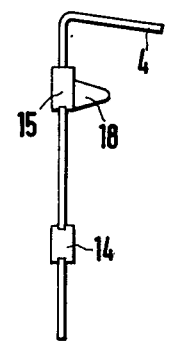

METHOD OF FORMING ELEMENTS OF INSULATING MATERIAL ON A BIMETAL STRIP

The present invention relates to a method of securing, by injection moulding, an element of an insulating material to a directly heated bimetal strip which may be used in an excess current switch.

No difficulties are experienced in the mechanical affixing of preformed dielectric elements to a bimetal strip. However when it is intended to affix an element of insulating material to a directly heated bimetal strip by injection moulding, then the corresponding mould has to be heated, for example to 160°, so that the synthetic material may be processed in a thermally correct manner. Additionally, the bimetal strip must remain in the injection mould for a specific period of time, e.g. 45 seconds, for the purpose of curing a thermosetting plastics material. If the bimetal strip was to be clamped in the injection mould substantially over its entire area, then such a bimetal strip would become useless for use in practical applications such as thermal tripping, since it would be plastically deformed as a result of the clamping operation.

According to one aspect of the present invention there is provided a method of forming, by injection moulding, an element of an insulating material on a bimetal strip, comprising clamping the bimetal strip in an injection mould by means of narrow clamping jaws disposed at either side, as viewed longitudinally of the bimetal strip, of a site on the bimetal strip to which the element is to be formed so that the remaining portions of the bimetal strip can freely bow in response to heating of the injection mould, and forming the element by injection moulding the insulating material onto the bimetal strip at the site.

By clamping the bimetal strip in the manner described, the properties of the bimetal strip are not altered by the use of injection moulding for the purpose of affixing an element of insulating material thereto. This is because the bimetal strip is clamped in the injection mould only to a very limited extent, the remaining portions of the bimetal strip can bow without hindrance, so that the bimetal strip will re-assume its original configuration after cooling.

If it is intended to affix a second element of insulating material spaced from the first one to the directly heated bimetal strip by injection moulding then the bimetal strip is released from its clamping after the first element has been affixed and it is clamped in the injection mould by means of narrow clamping jaws at either side, as viewed longitudinally of the bimetal strip, of the second insulating material element. By virtue of suitable cavities being disposed in the injection mould the remaining portions of the bimetal strip are free to bow. In this case too, the bimetal strip will revert to its original configuration after cooling.

The method in accordance with the invention may be utilised for producing a directly heated bimetal strip serving for thermal tripping in an excess current switch wherein one end of the bimetal strip is firmly secured and the free end of which will bow upon being heated. The bimetal strip has a respective connection for current supply at both its fastened end and its free end and is subdivided intermediate its ends into three or more parallel legs of uneven number which are situated longitudinally of the bimetal strip and are connected in series. In this context, the two elements of insulating material are used for firmly linking the interconnected ends of two adjacent legs to the third leg and to those undivided end portions of the bimetal strip which are devoid of legs. Such a bimetal strip has the advantage of having a relatively high resistance so that it can be used in place of an indirectly heated bimetal strip provided with a heating winding. A saving is thus achieved through the absence of a heating winding and an appreciable overload capacity of the bimetal strip is obtained. This meander-shaped bimetal strip will bow substantially like an unslit bimetal strip.

The method according to the present invention may be carried out in an injection mould for forming an element of an insulating material at a predetermined site on a bimetal strip, which injection mould has a mould cavity defining the shape of the element to be formed, narrow clamping jaws on either side of the mould cavity for clamping the bimetal strip at longitudinally spaced locations on either side of the predetermined site thereon, and further cavities disposed on the side of each clamping jaw remote from the mould cavity, for permitting the remaining portions of the bimetal strip to bow therein in response to heating the mould.

Preferably the mould is of such design that at least two bimetal strips can be clamped therein, one of the bimetal strips being clamped in the region of the first dielectric element and the other bimetal strip being clamped in the region of the second dielectric element. Subsequent to injection moulding of the two respective dielectric elements the two bimetal strips are mutually exchanged or switched about and the two other dielectric elements are produced in the course of a further injection moulding operation. If desired, the injection mould may be designed for clamping two strips or rows of parallel arranged bimetal strips which are interconnected by transverse webs, one of the rows being clampable at either side of the first dielectric elements and the other row being clampable at either side of the second dielectric elements and the cavities for moulding identical dielectric elements being connected to each other by communication passages. In this case again, the two strips or rows must be mutually exchanged or switched about subsequent to production of the respective elements of insulating material and cooling of the strips, so that thereafter the remaining insulating material elements can be produced at the corresponding sites of the individual bimetal strips. In this way it becomes possible to manufacture a relatively large number of single bimetal strips which, after their production, are separated from each other in a suitable severing tool by cutting off the transverse webs which link the individual bimetal strips and the identical dielectric elements.

The present invention will now be described, by way of example, with reference to the accompanying drawings, in which:

FIG. 1 is a lateral view of a slit bimetal strip having two elements of insulating material;

FIG. 2 is a plan view corresponding to FIG. 1;

FIG. 3 is a plan view of a strip consisting of seven individual bimetal strips according to FIGS. 1 and 2 which are interconnected by transverse webs and are not yet provided with insulating material elements;

FIG. 6 is a plan view of a strip according to FIG. 3 the individual bimetal strips of which strip are provided with one insulating material element;

FIG. 7 shows an end view of FIG. 6 from the left side;

FIG. 8 is a view similar to FIG. 6, the individual bimetal strips being provided with both insulating material elements; and FIG. 9 is an end view of FIG. 8 from the left side.

Figure 4:
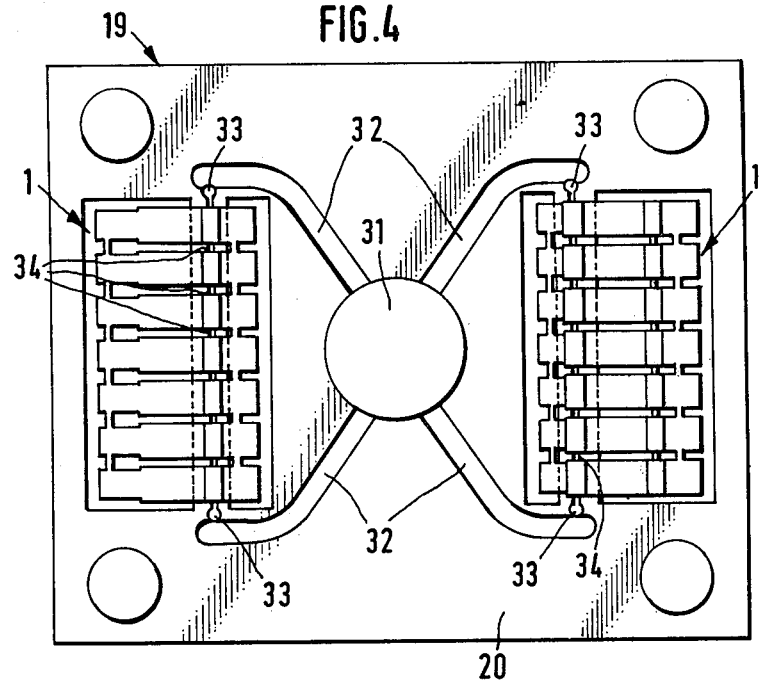
FIG. 4 is a plan view of an open injection mould for performing the method in accordance with the invention.

Referring to the drawings, FIG. 3 shows a strip 1 of bimetal which is sub-divided, by means of a suitable punching or stamping tool, into individual bimetal strips 2 positioned across the direction of rolling and interconnected or linked by transverse webs 3. As is apparent from FIG. 1 each bimetal strip 2 has a substantially perpendicularly bent portion 4 which serves for connection to a connecting lug of an excess current switch (not shown) which lug may be welded to the bent portion 4. The connecting lug is secured in the housing of an excess current switch such as that disclosed in German patent specification No. 1,051,951, the details of which are incorporated herein by way of reference. A median portion 5 of the bimetal strip 2 has been slit in such a manner that it is subdivided into three parallel legs 6 to 8 which are positioned longitudinally of the bimetal strip 2 and connected in series. The two outer legs 6 and 8 are mechanically and electrically connected to portions 9 and 10 of the bimetal strip 2 which are not slit, i.e. have no legs. The portion 10 merges into the bent portion 4. The portion 9 has a square aperture 11 into which a retaining protuberance or keeper serving as contact piece is inserted with a suitable peg and riveted to the portion 9. This contact piece and the connecting lug connected to the bent portion 4 serve to electrically connect the bimetal strip 2.

In order to obtain a bowing effect as is obtained with unslit bimetal strips, despite the fact that the bimetal strip 2 is subdivided into individual parallel arms 6 to 8, elements 14 and 15 of insulating material are provided in the regions 12 and 13 for the purpose of stabilising the bimetal strip 2. These elements 14 and 15 firmly link the interconnected ends 16 and 17 of the adjacent legs 6, 7 or 7, 8 to the third leg 8 or 6 and the portions 10 and 9 which are not slit, i.e. have no legs. Since the bimetal strip 2 upon being directly heated may reach elevated temperatures upto about 250° C, a thermosetting plastics material is used as insulating material for the elements 14 and 15, e.g. a glass-fibre reinforced polyester resin comprising about 30% glass fibres. For the purpose of moulding the elements 14 and 15 there is employed a suitable injection mould which is heated to 160° C so as to be able to process the synthetic material in a thermally correct manner. Thus the injection moulding temperature is relatively much below the permissible working temperature of the bimetal strip 2.

In accordance with FIG. 1 a cone 18 is unitarily moulded to the insulating material element 15. This cone 18 protrudes perpendicularly from the bimetal strip 2 and is acted upon by the conical end of a screw of an excess current switch for setting the intensity of the tripping current.

Figure 5:
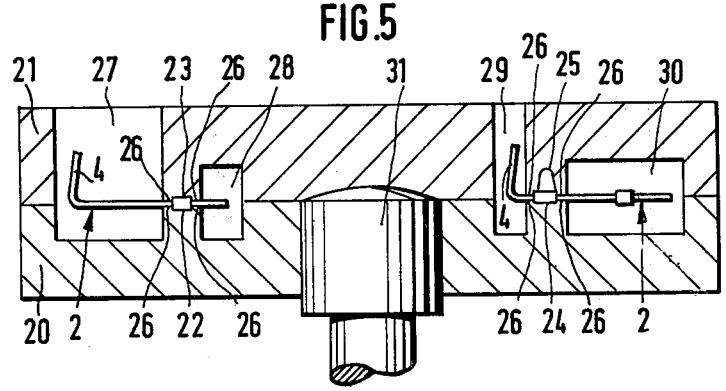
FIG. 5 is a section taken along line V—V of FIG. 4.

FIGS. 4 and 5 show an injection mould 19 which is comprised of a lower portion 20 and an upper portion 21. The lower portion 20 and the upper portion 21 have recesses or cavities 22, 23 and 24, 25 for moulding the insulating material elements 14 and 15. To either side, as viewed in the direction of the inserted bimetal strips 2, of these recesses the lower portion 20 and the upper portion 21 form narrow clamping jaws 26 whereby the bimetal strips 2 are clamped between lower portion 20 and upper portion 21. In this position of the bimetal strips 2 their remaining portions protrude into cavities 27, 28, 29, 30 of the lower portion 20 and the upper portion 21 so that these remaining portions are not prevented from bowing upon heating.

With the injection mould 19 closed the synthetic material is brought to injection sites 33, via passages 32, by an injection moulding piston 31. Communication passages 34 are provided between the individual recesses 22, 23, 24, 25 for moulding the insulating material elements 14, 15 so that all the aligned recesses 22, 23 or 24, 25 are connected to one another.

As is clearly apparent in FIG. 4 a respective strip 1 of bimetal is disposed in the right-hand and in the left-hand half of the injection mould 19. The elements 14 of insulating material are moulded to the strip 1 disposed in the left-hand half of the mould 19 and the elements 15 of insulating material are moulded to the strip 1 disposed in the right-hand half of the mould 19. The injection mould 19 is then opened and the two strips 1 of bimetal are exchanged so that thereafter the missing elements 15 or 14 can be moulded in a further injection moulding operation. The injection moulding temperature is of the order of 160° C and the strip 1 of bimetal must remain in the mould 19 for about 45 seconds so as to permit the synthetic material to cure. As a result of the heating each bimetal strip 2 bows without hindrance within its cavities during this interval. Upon the bimetal strips 2 cooling, their bowed portions revert to the original position. No detrimental deformation occurs during the injection moulding operation.

FIGS. 6 and 7 show a strip 1 the bimetal strips 2 of which are only provided with the elements 14. In the strip 1 of FIGS. 8 and 9 the individual bimetal strips 2 are provided with both the elements 14 and 15. Thereafter it is merely necessary to remove, by means of a suitable severing tool, the transverse webs 3 and the transverse webs 35 which have been moulded via communication ducts 34, whereby individual bimetal strips 2 in accordance with FIGS. 1 and 2 are obtained. These bimetal strips are described in greater detail in copending patent application Ser. No. 617,169 filed Sept. 26th, 1975 (Inventor: Jakob Phillipp Ellenberger), now U.S. Pat. No. 4,000,484 issued Dec. 28th, 1976.

We claim:

1. A method of forming, by injection moulding, first and second elements of insulating material on each of at least two bimetal strips, with the second element being spaced from the first element, comprising the steps of a. clamping a respective bimetal strip in an injection mould by means of narrow clamping jaws disposed at either side, as viewed longitudinally of the respective bimetal strip, of a first site on the respective bimetal strip to which the first element is to be formed, so that remaining portions of the respective bimetal strip can bow freely in response to heating of said injection mould, b. forming the first element on said first site by injection moulding, c. unclamping the respective bimetal strip after the first element has been formed, d. clamping the respective bimetal strip in said injection mould by means of narrow clamping jaws disposed at either side, as viewed longitudinally of the respective bimetal strip, of a second site on the respective bimetal strip to which the second element is to be formed so that the remaining portions of the respective bimetal strip can freely bow in response to heating of said injection mould, and e. forming the second element on said second site by injection moulding, f. said steps (a) through (e) being carried out such that said bimetal strips are clamped in said injection mould with one of said bimetal strips being clamped in a region of said first site and the other of said bimetal strips being clamped in a region of said second site, that after said elements have been injection moulded on said two bimetal strips at their respective sites, said two bimetal strips are mutually exchanged and clamped on either side of said second site and said first site, respectively, and that thereafter the two further elements are produced by a further injection moulding operation.

2. A method as claimed in claim 1, wherein each bimetal strip is one of a plurality of adjacent bimetal strips formed in an elongate strip of bimetal, said first-mentioned element is formed on each of the bimetal strips in one injection moulding operation, said second element is formed of each of the bimetal strips in a second injection moulding operation, and each elongate strip is subsequently sub-divided into respective, separate bimetal strips.

3. A method as claimed in claim 1, wherein each said bimetal strip is one of a plurality of adjacent bimetal strips formed in an elongate strip of bimetal, said first-mentioned element is formed on each of the bimetal strips in one injection moulding operation, said second element is formed on each of the bimetal strips in a second injection moulding operation, and said elongate strip is subsequently sub-divided into respective, separate bimetal strips.

4. A method as claimed in claim 1 for producing a directly heated bimetal strip serving for a thermal trip in an excess current switch in which one end portion of said bimetal strip is rigidly secured and the other end portion is free to bow upon heating, said bimetal strip has respective connections for current supply at its secured and at its free end portions, and is subdivided intermediate its end portions into at least three parallel legs extending longitudinally of said bimetal strip and connected in series, wherein junctions of two adjacent legs are firmly connected to the third leg and the adjacent undivided end portions of the bimetal strip by said two elements of said insulating material.

5. A method of forming, by injection moulding, first and second elements of insulating material on a bimetal strip with the second element being spaced from the first element, comprising the steps of a. clamping the bimetal strip in an injection mould by means of narrow clamping jaws disposed at either side, as viewed longitudinally of the bimetal strip, of a first site on the bimetal strip to which the first element is to be formed, so that the remaining portions of the bimetal strip can bow freely in response to heating of said injection mould, b. forming the first element on said first site by injection moulding, c. unclamping the respective bimetal strip after the first element has been formed, d. clamping the bimetal strip in said injection mould by means of narrow clamping jaws disposed at either side, as viewed longitudinally on the bimetal strip, of a second site on the bimetal strip to which the second element is to be formed so that the remaining portions of the bimetal strip can freely bow in response to heating of said injection mould, and e. forming the second element on said second site by injection moulding, f. said steps (a) through (e) being carried out such that the bimetal strip is one of a plurality of adjacent bimetal strips which themselves are formed in two elongate strips of bimetal, that the first element is formed on each of the bimetal strips in one injection moulding operation and the second element on each of the bimetal strips is formed in a second injection moulding operation, that said elongate strips of bimetal are mutually exchanged in said injection mould after a first injection moulding operation so that a second injection moulding operation can be effected to provide each elongate strip with the first and second elements of insulating material at their respective sites, and that said elongate strips of bimetal are subsequently sub-divided into respective, separate bimetal strips.

* * * * *

UNITED STATES PATENT AND TRADEMARK OFFICE
CERTIFICATE OF CORRECTION

PATENT NO. : 4,069,289
DATED : January 17, 1978
INVENTOR(S) : Fritz Krasser et al It is certified that error appears in the above-identified patent and that said Letters Patent are hereby corrected as shown below:

In the heading of the patent, under [30] Foreign Application Priority Data, change "May 20, 1975" to --May 10, 1975--.

Column 4, line 45, change "Phillipp" to --Philipp--.

Column 5, line 23, change "of" second occurrence, to --on--.

Signed and Sealed this

Twenty-third Day of May 1978

[SEAL]

Attest:

RUTH C. MASON
Attesting Officer

LUTRELLE F. PARKER
Acting Commissioner of Patents and Trademarks